United States Patent
Truong et al.

(10) Patent No.: US 6,173,057 B1
(45) Date of Patent: Jan. 9, 2001

(54) METHOD OF MAKING SECURE AND CONTROLLING ACCESS TO INFORMATION FROM A COMPUTER PLATFORM HAVING A MICROCOMPUTER

(75) Inventors: André Truong, Jouy-en-Josas; Jean-Christophe Ferry, Montigny-le-Bretonneux; Gilles Michel, Chatillon, all of (FR)

(73) Assignee: Advanced PC Technologies (APCT), Bievres (FR)

( * ) Notice: Under 35 U.S.C. 154(b), the term of this patent shall be extended for 0 days.

(21) Appl. No.: 09/101,685

(22) PCT Filed: Nov. 13, 1997

(86) PCT No.: PCT/FR97/02034

§ 371 Date: Jul. 15, 1998

§ 102(e) Date: Jul. 15, 1998

(87) PCT Pub. No.: WO98/22862

PCT Pub. Date: May 28, 1998

(30) Foreign Application Priority Data

Nov. 15, 1996 (FR) .................................................. 96 13951

(51) Int. Cl.$^7$ ....................................................... H04K 1/00
(52) U.S. Cl. .......................................... 380/255; 380/259
(58) Field of Search ............................... 713/182; 705/64; 380/255, 259

(56) References Cited

U.S. PATENT DOCUMENTS

| | | | |
|---|---|---|---|
| 5,191,611 | 3/1993 | Lang | 380/25 |
| 5,327,497 | * 7/1994 | Mooney et al. | 380/25 |
| 5,444,850 | 8/1995 | Chang | 395/200.1 |
| 5,784,462 | * 7/1998 | Tomida et al. | 380/21 |
| 5,960,085 | * 9/1999 | De La Huerga | 380/25 |

FOREIGN PATENT DOCUMENTS

| | | |
|---|---|---|
| 0 089 876 A1 | 9/1983 | (EP) . |
| 0 421 409 A2 | 4/1991 | (EP) . |
| 0 737 907 A2 | 10/1996 | (EP) . |
| WO 95/24696 | 9/1995 | (WO) . |

OTHER PUBLICATIONS

Paul C. Clark et al., "Bits: A Smartcard Protected Operating System", vol. 37, No. 11, Nov. 1, 1994, pp. 66–70 and 94.

* cited by examiner

Primary Examiner—Thomas R. Peeso
Assistant Examiner—Todd Jack
(74) Attorney, Agent, or Firm—Morgan, Lewis & Bockius LLP

(57) ABSTRACT

A method of securing and monitoring access to information from a computer platform. At least one non-rewritable recording medium with information and operating software is produced. Users are authorized by defining user access rights to the information stored on the reading medium. A portable medium having information regarding the defined access rights recorded thereon is issued to each authorized user. The recording medium and the portable medium are inserted into readers fitted to the computer platform. The computer platform is configured into a secure workstation by executing security functions based upon parameters recorded on the recording medium, the portable medium, and the computer platform. After security functions are executed, operating software from the recording medium is loaded to the computer platform. The method enables the information stored on the recording medium to be accessed according to the defined access rights. The method also enables secure communications between the computer platform and a connected network.

17 Claims, 1 Drawing Sheet

Figure 1:
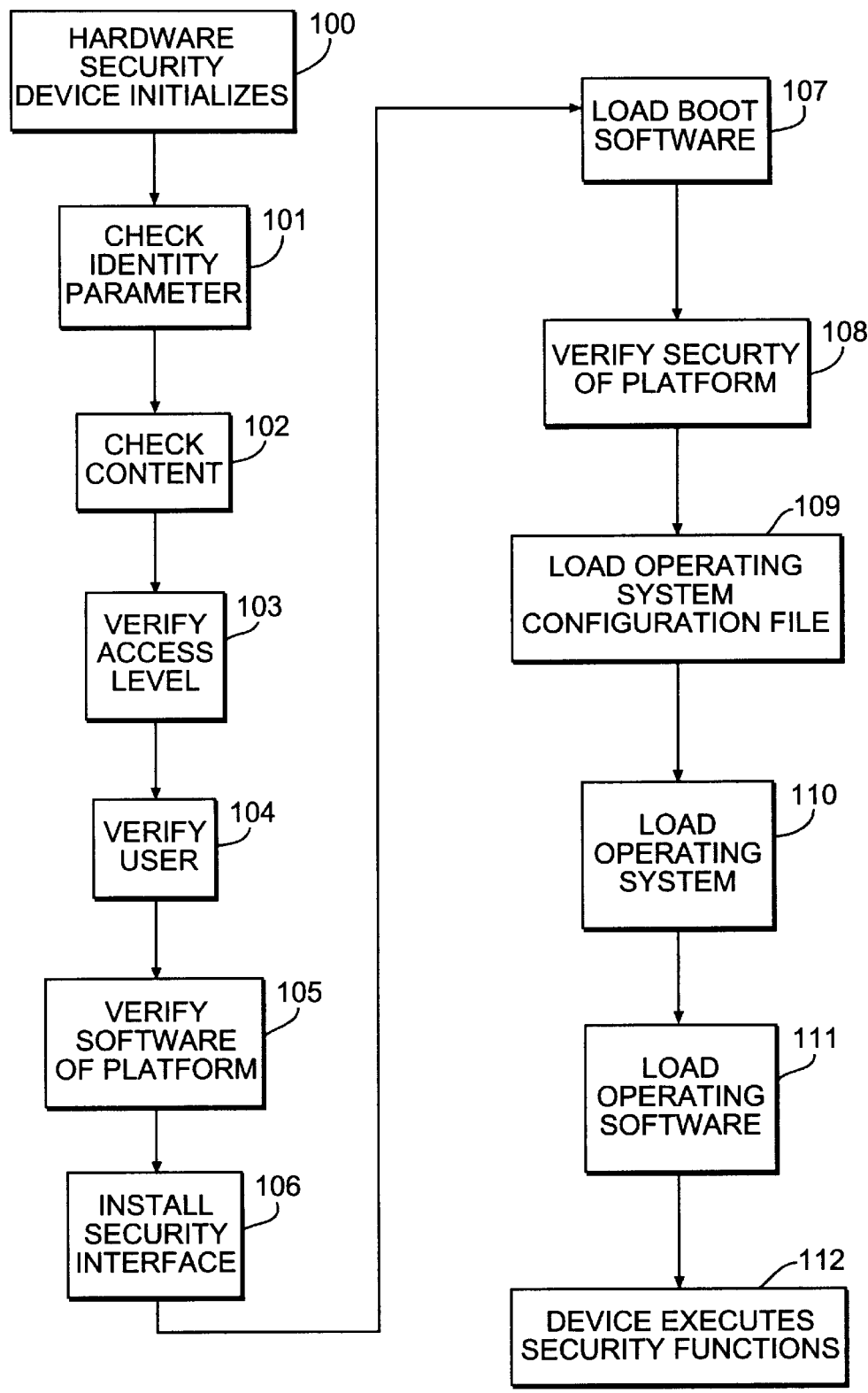

METHOD OF MAKING SECURE AND CONTROLLING ACCESS TO INFORMATION FROM A COMPUTER PLATFORM HAVING A MICROCOMPUTER

BACKGROUND OF THE INVENTION

1. Field of the Invention

The present invention relates to a method of securing and controlling access to information, such as data and/or applications, from a computer platform having a microcomputer.

2. Description of Related Art

In general, the strongly developing market for microcomputers, network technology, and low-cost large-capacity recording media has led to conditions that are favorable for increasing communication and/or interchange of information. The developing market also enables commercial activities based on making data and/or applications available to potential users on demand, and in return for payment. Moreover, the activities primarily use personal microcomputers.

Unfortunately, a personal microcomputer is designed for a variety of uses (personal or professional applications, games, technical applications, . . . ), and thus has an "open" architecture. New elements, both software and hardware, can readily be added to change the configuration of the machine as a function of users' own requirements and/or as a function of the services or applications accessible to users.

As a result, there are computer platforms that operate in a generally non-secure context, which context is even less secure in that there is always parallel activity in the development of piracy techniques. This parallel development of piracy can present problems as a function of the uses, services, and/or applications that may be implemented on such "open" architecture computer platforms.

To solve these problems, numerous solutions have been proposed in the field of security. For example, some solution have been to install identity codes to identify users before any communication or interchange of data; install access codes to obtain authorization to access data and/or applications; use encoding or encrypting techniques to guarantee that data being transmitted or interchanged is kept confidential or secret; and use authorization techniques to verify the accuracy of data that is being transmitted or exchanged.

Unfortunately, even at high levels of sophistication, such solutions turn out to be insufficient. Even with all or some of the solutions that have been proposed in the past, such applications cannot be viable if the information is accessed on a computer platform that is not secure. The reliability of safety checks intended to guarantee that a user is indeed entitled to access the information and/or that the fees corresponding to said access have indeed been paid can never be complete when the checks are performed in a non-secure environment.

SUMMARY OF THE INVENTION

Accordingly, the present invention is directed to a method of securing and controlling access to information from a computer platform that substantially obviates one or more of the problems due to limitations and disadvantages of the related art.

For a small extra cost with respect to hardware and software architecture, the security provided by such a method is of a high level. The cost of the hardware components to be added to a basic personal microcomputer is modest. Standard components can be added incrementally to the basic architecture. The software cost, independently of the data and applications that are to be protected, is fixed for each operating system supported.

In general, the method can be implemented on two types of computer platforms. A "closed" platform initially designed to integrate the security hardware elements in the basic hardware architecture (on the mother board), and an "open" platform where an additional card is added to provide the hardware and/or software components necessary to implement the method.

An important advantage of the invention is that any recording medium, even when duplicated, cannot be used on a machine that does not comply with the method. Another advantage of the present invention is that when the secured computer platform is in dialog over a network with a controlling server or another computer platform, that other platform or server knows that the dialog will take place in complete security. An additional advantage of the invention is that any publisher of applications is guaranteed that access to and use of its recording media will be performed in compliance with the conditions placed on the users.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method of securing and monitoring access to information from a computer platform comprising the steps of producing at least one non-rewritable recording medium on which information and operating software are recorded, authorizing users by defining user access rights to the information stored on the recording medium, issuing a portable medium to each authorized user, the portable medium having information regarding the defined access rights recorded thereon, inserting the recording medium and the portable medium into readers fitted to the computer platform, configuring the computer platform of the authorized user into a secure workstation by executing security functions based upon parameters recorded on the recording medium, the portable medium, and the computer platform, loading the operating software from the recording medium to the computer platform after security functions are executed, enabling the information stored on the recording medium to be accessed according to the defined access rights, and enabling secure communications between the computer platform and a connected network.

It is to be understood that both the foregoing general description and the following detailed description are exemplary and explanatory and are intended to provide further explanation of the invention as claimed.

BRIEF DESCRIPTION OF THE OF THE DRAWING

The accompanying drawing, which is included to provide a further understanding of the invention and is incorporated in and constitute a part of this specification, illustrate an embodiment of the invention and together with the description serve to explain the principles of the invention.

In the drawing:

FIG. 1 is a flow diagram of a method of securing and monitoring access to information from a computer platform according to the present invention.

DETAILED DESCRIPTION OF THE INVENTION

The method of the invention makes it possible to ensure that access to information is secure, and that access is controlled. The method of the invention includes three main stages, each of which is discussed below.

In the first stage, at least one non-rewritable recording medium is produced. The content of the recording medium can be read but not modified or altered. This recording medium contains information to be protected, which is made available to potential users using a personal computer, generally in return for payment. In this first stage, the information (i.e., data and/or applications) to be protected, the operating systems for the information, and a set of security and control parameters are defined.

The control parameters are necessary to operate the software that uses the data and/or applications on the user's computer platform. The security parameters are necessary to use the recording medium in a secure manner and to ensure that the information stored on the recording medium is secure. Examples of security parameters for securing a recording medium may include an identity parameter specific to the medium, an authentication parameter for authenticating the contents of the recording medium, and a security table containing decoding algorithms in encrypted form. Examples of security parameters for securing the information stored on the recording medium may include a parameter indicating the security level required in order to use the recording medium, and at least one identity parameter specific to the data and/or each application stored on the recording medium.

All of the above information is formatted using a predetermined logic format. Some or all of the information is encoded or encrypted to provide better protection in accordance with the above-mentioned security table. It should be observed that these operations are transparent relative to the data and/or applications that are to be protected. The information is stored on a non-rewritable recording medium, preferably a medium having large storage capacity and low cost (e.g., CD-ROM or DVD).

In the second stage, the computer platform is secured so that the recording medium can be used and operated in a secure manner. In general, the method utilizes a hardware security device with at least ROM-type memory containing security and control software, and a management controller.

Two scenarios need to be considered. Computer platforms having so-called "closed" architecture and a computer platform having so-called "open" architecture. A computer platform is said to be of "closed" architecture when the machine has been specially designed or adapted to implement the method, i.e., integrating the hardware security device and associated software. In contrast, an "open" architecture platform must be secured by integrating the hardware security device with the associated software.

At this stage, it should be observed that a purely software security solution is by definition fragile. Therefore, in order to make security more reliable, the present invention incorporates a hardware device. The hardware security device and the associated software prevent any hardware and/or software from making unauthorized use of the recording medium, and provides continuous monitoring so that the method is performed according to the required security conditions.

The third stage concerns a potential user accessing and using the recording medium from a secure computer platform. To illustrate the third stage, an example is described below in which the first stage is performed by a publisher who gives users free recording media, but requires payment in order to use the information.

The publisher supplies the user a recording medium and a portable medium (e.g., smart card). The publisher may record the following information on the smart card: An identity code specific to the user (i.e., a PIN code); Keys for decoding or decrypting information stored on the recording medium; The security level needed to make use of the information; and the identity parameter specific to the data and/or applications, which corresponds to the parameter stored recorded on the recording medium. The recording medium and the portable medium are inserted into appropriate readers of the user's secure computer platform.

Monitoring software stored in the hardware security device controls the initial operation of the computer platform. As shown in FIG. 1 step 100, the hardware security device initializes itself and passes from one state to another state on the basis of time criteria. If the device does not receive any information or commands within a determined length of time, execution of the method is automatically stopped.

The hardware security device performs the following steps. First, the hardware security device and the associated software identify the recording medium. The management controller 101 compares the identity parameter of the recording medium with the parameter prerecorded in the hardware security device. If they are not identical or do not satisfy a predetermined relationship, then execution of the method is automatically stopped. The machine is no longer secure in the sense that the hardware security device and the associated software are no longer accessible. However, if the verification is successful, then the recording medium has been correctly identified. Successful identification of the recording medium does not give the user access to the information stored on the medium.

Second, the security hardware device and the associated software then verify in step 102 the integrity of the contents of the recording medium. To this end, the hardware security device compares the encrypted signature stored on the recording medium with a signature decrypted by the hardware security device or by the CPU of the computer platform. The calculation of the signature is based on information taken from the recording medium.

If the comparison between the two encrypted signatures fails, then the contents of the recording medium have been modified, i.e., it is not the same content which was originally produced. Since the computer platform is no longer secure, implementation of the method is stopped, and, preferably the operation of the computer platform is suspended. The user must then restart the computer platform under normal conditions of operation, but without the ability to access or use the recording medium, the hardware security device, and the associated software. However, if the hardware security device verifies the two encrypted signatures then the integrity of the information stored on the recording medium is confirmed.

Third, in step 103 the security device and associated software verify the security level required in order to use the data and/or application on the recording medium. The security level recorded on the computer's portable medium is read and compared with that recorded on the recording medium. If the security level verification fails, then access to the computer platform is blocked.

Fourth, in step 104 the security device and the associated software verify whether the user is authorized to use the data and/or applications stored on the recording medium. The hardware security device reads at least one parameter specific to an application and compares it with the corresponding parameter recorded on the recording medium. If this verification fails, then access to the computer platform is blocked.

Fifth, to determine whether there has been any breach in the security of the method, in step 105 of FIG. 1 the hardware security device and the associated software verify that the basic software of the computer platform has not been modified. If such a breach is detected, using known techniques, then access to the computer platform is blocked, as before.

Sixth, the hardware security device and the associated software curb the basic software of the computer platform, especially when the architecture is considered to be "open." The hardware security device inhibits certain functions of the basic software and will execute new functions required to properly use the data and/or applications from the recording medium. Software features curtailed include those that would normally give access to the recording medium.

Before beginning the second stage of the boot process, the hardware security device and the associated software in step 106 install an interface, independent of the hardware environment, to provide access to all of the security functions to be used by the operating system after being loaded from the recording medium. The first stage of the boot procedure checked the recording medium and the user's access rights. Next, security checks will be executed to verify the integrity of the computer platform both with respect to the hardware and with respect to the software.

In step 108, boot software loaded from the recording medium to the platform, as shown in step 107, verifies that the security conditions, which have been satisfied by the recording medium when checked by the computer platform, are also satisfied by the computer platform when checked by the recording medium. The boot software checks that the hardware security device is properly installed, that the basic software of the computer platform has indeed been curbed, that the identity parameter specific to the medium and recorded in the security hardware device does indeed correspond with that which is recorded on the recording medium, and that the authentication parameter for the contents of the recording medium corresponds to that which has likewise been recorded on the recording medium.

Once all of those checks have been performed, the computer platform is certain that it is accessing and using a recording medium that complies with the medium that was produced. Conversely, the recording medium is certain that it is being used by a computer platform that is properly secure and by a user who is properly authorized, and that it is being used within the rights that have been acquired by the user.

As shown in step 110, the operating system can then be loaded from the recording medium to the platform. Since the operating system is independent of the operating system of the computer platform, configuration software 109 stored on the recording medium may be needed. By storing all necessary parameters on the hardware security device, the configuration software enables the computer platform to execute the operating system for the data and/or applications. As shown in step 111, the operating software is then loaded onto the computer platform from the recording medium. The software enables an authorized user to use the data and/or applications stored on the recording medium in a secure manner.

Using the pre-installed security interface and the associated software installed at the end of the first stage of the boot process, the operating software loaded from the recording medium or the application monitor the use of the information on the recording medium in step 112. To reinforce the security of the method, it is preferred that the operating system for the data and/or applications also comply with the security functions that applied during the boot stage. This may preclude the initialization of software that has not been previously checked or prevent access to a peripheral that is not provided for by the method.

Thus, in order to implement the present invention, the user's computer platform must be properly secured, and the user must have available not only the recording medium containing at least the data and/or applications and accompanying operating software, but must also have available a memory card defining, in particular, conditions for accessing the recording medium.

What is claimed is:

1. A method of securing and monitoring access to information from a computer platform, the method comprising:
producing at least one non-rewritable recording medium on which information and operating software are recorded;
authorizing users by defining user access rights to the information stored on the recording medium;
issuing a portable medium to each authorized user, the portable medium having information regarding the defined access rights recorded thereon;
inserting the recording medium and the portable medium into readers fitted to the computer platform;
configuring the computer platform of the authorized user into a secure workstation by executing security functions based upon parameters recorded on the recording medium, the portable medium, and the computer platform;
loading the operating software from the recording medium to the computer platform after security functions are executed;
enabling the information stored on the recording medium to be accessed according to the defined access rights; and
enabling secure communications between the computer platform and a connected network.

2. The method according to claim 1, wherein the step of producing at least one non-rewritable recording medium comprises the steps of:
defining information to be protected;
defining an operating system for the protected information;
defining a set of check parameters to enable the operating software loaded from the recording medium to the computer platform to operate; and
defining a set of security parameters for making use of the recording medium secure and enabling the information stored on the recording medium to be used.

3. The method according to claim 2, wherein the security parameters for making use of the recording medium secure include an identity parameter specific to the recording medium and an authentication parameter for authenticating contents of the recording medium.

4. The method according to claim 2, wherein defining security parameters for making use of the recording include defining a security level required to access the information on the recording medium, and defining a parameter specific to the information.

5. The method according to claim 2, further comprising the steps of encrypting at least part of the information on the recording medium, and storing on the recording medium a security table containing decrypting algorithms in encrypted form.

6. The method according to claim 5, further comprising the step of recording on the portable medium keys for decrypting the information stored on the recording medium.

7. The method according to claim 1, further comprising the step of recording on the portable medium of each user parameters including a security level required to use the information on the recording medium and identity of the information, the security level and identity parameters corresponding to those recorded on the recording medium.

8. The method according to claim 1, wherein the step of configuring a computer platform into a secure workstation further comprises the steps of:

integrating in the platform a hardware security device and associated checking software;

recording on the hardware security device the identity parameter specific to the recording medium, and the identity parameter of the information of the recording medium; and causing the checking software to identify the identity parameter specific to the recording medium by comparing corresponding parameters recorded on the recording medium and the hardware security device, the identity parameter of the information on the recording medium by comparing the corresponding parameters recorded on the recording medium and the hardware security device, and the level required to use the information by comparing the corresponding parameters on the recording medium and on the portable medium.

9. The method according to claim 1, further comprising the step of, prior to loading the operating software from the recording medium, verifying from boot software loaded from the recording medium that the security conditions which have been satisfied by the recording medium when monitored by the computer platform are also satisfied by the platform when monitored by the recording medium.

10. The method according to claim 1, further comprising the steps of making the operating system stored on the recording medium independent from an operating system of the computer platform, and loading configuration software from the recording medium to provide the parameters required for executing the operating system stored on the recording medium.

11. The method according to claim 1, further comprising the step of, after the operating system has been loaded from the recording medium, causing the system to execute security functions relating both to the recording medium and to the computer platform to reinforce the security.

12. The method according to claim 1, wherein the information recorded on the recording medium includes data.

13. The method according to claim 1, wherein the information recorded on the recording medium includes applications.

14. The method according to claim 1, wherein the portable medium issued to each user is a smart card.

15. The method according to claim 3, wherein the authentication parameter for authenticating contents of the recording medium includes encrypted signatures.

16. The method according to claim 2, further comprising the steps of encoding at least part of the information on the recording medium, and storing on the recording medium a security table containing decoding algorithms in encrypted form.

17. The method according to claim 5, further comprising the step of recording on the portable medium keys for decoding the information stored on the recording medium.

* * * * *